United States Patent
Hansel et al.

(10) Patent No.: US 12,528,055 B2
(45) Date of Patent: Jan. 20, 2026

(54) HOLLOW FIBER MEMBRANE FOR SEPARATING BLOOD PLASMA FROM BLOOD

(71) Applicant: FRESENIUS MEDICAL CARE DEUTSCHLAND GMBH, Bad Homburg (DE)

(72) Inventors: Dietmar Hansel, Bad Homburg (DE); Michael Paul, Bad Homburg (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 439 days.

(21) Appl. No.: 17/926,638

(22) PCT Filed: Jun. 1, 2021

(86) PCT No.: PCT/EP2021/064666
§ 371 (c)(1),
(2) Date: Nov. 21, 2022

(87) PCT Pub. No.: WO2021/245075
PCT Pub. Date: Dec. 9, 2021

(65) Prior Publication Data
US 2023/0321610 A1     Oct. 12, 2023

(30) Foreign Application Priority Data
Jun. 2, 2020   (DE) .................... 10 2020 206 867.4

(51) Int. Cl.
*B01D 69/08*      (2006.01)
*A61M 1/34*       (2006.01)
(Continued)

(52) U.S. Cl.
CPC ......... *B01D 69/088* (2013.01); *A61M 1/3496* (2013.01); *B01D 67/0016* (2013.01);
(Continued)

(58) Field of Classification Search
None
See application file for complete search history.

(56) References Cited

U.S. PATENT DOCUMENTS

| | | |
|---|---|---|
| 2005/0274665 A1 | 12/2005 | Heilmann et al. |
| 2010/0163488 A1 | 7/2010 | Fislage et al. |
| 2019/0381462 A1 | 12/2019 | Keller et al. |
| 2020/0188860 A1 | 6/2020 | Paul et al. |

FOREIGN PATENT DOCUMENTS

| | | |
|---|---|---|
| DE | 102007019051 B3 | 10/2008 |
| DE | 102017201630 A1 | 8/2018 |

(Continued)

OTHER PUBLICATIONS

International Preliminary Report on Patentability issued in corresponding International Patent Application No. PCT/EP2021/064666 (English translation) mailed Dec. 15, 2022 (8 pages).

(Continued)

*Primary Examiner* — Krishnan S Menon
(74) *Attorney, Agent, or Firm* — Kilyk & Bowersox, P.L.L.C.

(57) ABSTRACT

A hollow fiber membrane for separating blood plasma from blood, comprising a blood contact layer and a support layer each comprising a hydrophobic polymer, a hydrophilic polymer and vitamin E, and a method for producing said hollow fiber membrane to provide a hollow fiber membrane is described. The hollow fiber membrane is characterized by a reduced hemolysis activity so that the hollow fiber membrane can be advantageously used in plasmapheresis methods.

18 Claims, 4 Drawing Sheets

Figure 1:
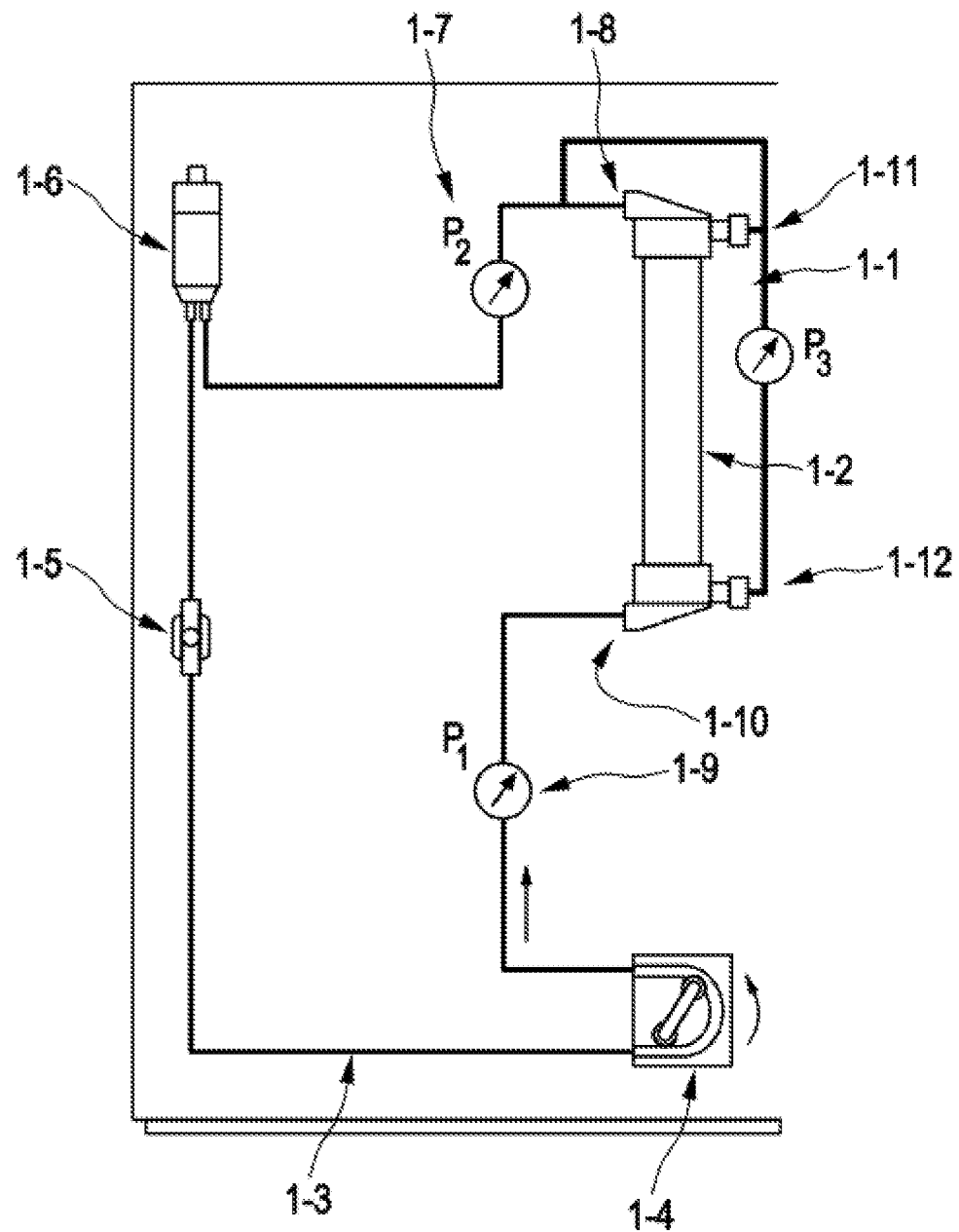

(51) Int. Cl.
  *B01D 67/00*  (2006.01)
  *B01D 69/02*  (2006.01)
  *B01D 69/14*  (2006.01)
  *B01D 71/44*  (2006.01)
  *B01D 71/68*  (2006.01)

(52) U.S. Cl.
  CPC ........... *B01D 69/02* (2013.01); *B01D 69/144* (2013.01); *B01D 71/441* (2022.08); *B01D 71/68* (2013.01); *B01D 2323/08* (2013.01); *B01D 2323/2182* (2022.08); *B01D 2325/04* (2013.01); *B01D 2325/36* (2013.01); *B01D 2325/38* (2013.01)

(56) References Cited

FOREIGN PATENT DOCUMENTS

| | | |
|---|---|---|
| EP | 0749775 A1 | 12/1996 |
| EP | 2529769 A1 | 12/2012 |
| EP | 2987514 A1 | 2/2016 |
| JP | 9-66225 A | 3/1997 |

OTHER PUBLICATIONS

International Search Report and Written Opinion issued in corresponding International Patent Application No. PCT/EP2021/064666 (with English translation of International Search Report) mailed Aug. 12, 2021 (16 pages).
Office Action issued in corresponding German Patent Application 102020206867.4 mailed Feb. 17, 2021 (7 pages).
Office Action issued in corresponding Japanese Patent Application No. 2022-572357 issued Jan. 27, 2025 (translation only)(4 pages).

HOLLOW FIBER MEMBRANE FOR SEPARATING BLOOD PLASMA FROM BLOOD

This application is a National Stage Application of PCT/EP2021/064666, filed Jun. 1, 2021, which claims priority to German Patent Application No. 10 2020 206 867.4, filed Jun. 2, 2020.

SUBJECT OF THE INVENTION

The subject of the invention relates to a hollow fiber membrane for separating blood plasma from blood. Such hollow fiber membranes are used in the extracorporeal blood treatment therapy of patients. Furthermore, the invention relates to a method for producing such hollow fiber membranes.

BACKGROUND OF THE INVENTION

Hollow fiber membranes are inter alia used in the therapy of extracorporeal blood treatment to separate blood plasma from blood of patients and to treat it with suitable forms of treatment. Such hollow fiber membranes are therefore also called plasma membranes. The therapeutic method for separating blood plasma from blood is called plasmapheresis. The term plasmapheresis stands for a medical procedure to extract blood plasma from blood.

Distinction is made between several plasmapheresis methods. In non-specific plasmapheresis, the complete blood plasma is separated from the cellular blood components. From a therapeutic point of view, non-specific separation of blood plasma from blood requires fluid balancing, e.g. substitution with a plasma expander during the procedure and/or fresh plasma addition to the patient.

Selective plasmapheresis is used, for example, in the therapy of autoimmune diseases. Selective hollow fiber membranes, which separate only a part of the plasma proteins in the blood plasma, are used for this purpose. Cascade filtration, which is used in therapeutic procedures, should also be mentioned in this context. Here, the blood plasma can first be separated non-specifically from the blood in a first filtration step and then selectively from the separated blood plasma in a second filtration step.

In general, the term blood plasma refers to the non-cellular portion of blood. Human blood plasma consists of approx. 90% water and 10% of substances dissolved in it, in particular also colloidally contained plasma proteins (e.g. albumins, lipoproteins, immunoglobulins, fibrinogen). Blood plasma is more viscous than water due to the content of plasma proteins. The plasma viscosity is mainly determined by the high-molecular proteins immunoglobulins and fibrinogen. The amount of blood plasma in the blood volume is about 55 vol. %, the amount of cellular blood components is correspondingly about 45 vol %.

In applied plasmapheresis procedures, blood is taken from a patient in the course of an extracorporeal blood treatment and is passed through a hollow fiber membrane filter via an extracorporeal blood circuit. Plasma separation is achieved in the hollow fiber membrane filter on suitable hollow fiber membranes via filtration. The blood plasma is transported by convective transport (i.e. by a pressure difference) across the membrane wall of the hollow fiber membranes and is separated. For this purpose, blood is introduced into the hollow fiber membrane filter and is normally passed through the lumina of the hollow fiber membranes. The transmembrane pressure difference, which is adjusted by the apparatus, transports the blood plasma over the membrane wall, whereby cellular components of the blood are retained by the membrane wall.

The hollow fiber membranes intended for plasma separation must therefore meet specific requirements in order to enable therapeutic plasma separation as described here. The pores of the plasma membranes are such that the components, i.e. the plasma proteins, of the plasma can pass through the membrane. In particular, certain kinds of therapies require that high-molecular plasma proteins, such as the "low density lipoprotein" (LDL) with a molecular weight of approx. 2.7 MDa, must also be able to pass through the membrane wall of the hollow fiber membrane, although blood cells are to be retained due to the size of the pores. For specific plasmapheresis procedures, it may also be required that not all plasma proteins of the blood plasma may pass the membrane wall, but only some of the plasma proteins that are in a lower molecular weight range.

Hollow fiber membranes for blood plasma separation from blood therefore differ from known hollow fiber membranes used in hemodialysis by their pore size. In the therapy of extracorporeal hemodialysis, it is particularly necessary to separate low and middle molecular weight metabolites from the blood of patients. However, these hollow fiber membranes for extracorporeal blood treatment are such that albumin with a molecular weight of approx. 66 kDa is almost completely retained by the hollow fiber membranes. In contrast, plasma separation requires that the pore size of the selective layer of the membrane is as large as possible relative to the cellular components of the blood, so that the cellular components are excluded from membrane transition, whereas the plasma proteins can pass through the membrane wall.

The separation of blood plasma from blood by hollow fiber membranes is regularly accompanied by a detrimental occurrence of haemolysis. It is suspected that the membrane structure, caused by the large pores of the hollow fiber membranes, in combination with the transmembrane pressure difference necessary for filtration, acts mechanically on the blood cells, causing cell damage and destroying red blood cells. The occurrence of haemolysis reactions during plasma separation is problematic from a therapeutic point of view. In that case, the separated blood plasma is contaminated with haemoglobin and cell fragments, so that in this case the separated blood plasma cannot be used for further therapeutic steps.

DE 10 2007 019 051 B3 reveals a two-layer hollow fiber membrane for the separation of blood plasma from blood, produced by coextrusion from two spinning masses. The hollow fiber membrane is characterized by a coarse-meshed selective blood contact layer and a porous support layer.

DE 10 2017 201 630 A1 describes the production of a hollow fiber membrane for blood treatment by extrusion of a spinning mass, whereby the spinning mass contains an amount of vitamin E and the inner precipitant contains a proportion of a hydrophilic polymer.

OBJECT OF THE INVENTION

In view of the afore-mentioned problems, the first aspect was to provide a hollow fiber membrane for the separation of blood plasma from blood, which exhibits a reduced hemolysis activity.

In a second aspect, it was an object to find a method for producing said hollow fiber membranes for plasma separation.

A third aspect of the underlying problem was to provide a sterile hollow fiber membrane filter for the separation of blood plasma from blood, which has such a low hemolysis activity that it can be advantageously used in plasmapheresis procedures.

SUMMARY OF THE INVENTION

In a first aspect of the invention, the underlying problem is solved by a hollow fiber membrane with the features as described herein.

In a second aspect of the invention, the underlying problem is solved by a method having the features as described herein.

In a third aspect, the underlying problem is solved by a sterile hollow fiber membrane filter with the features as described herein.

DETAILED DESCRIPTION OF THE INVENTION

A first aspect of the present invention relates to a hollow fiber membrane for separating blood plasma from blood, comprising a blood contact layer and a support layer, each comprising a hydrophobic and a hydrophilic polymer and vitamin E, in particular a α-tocopherol or a tocotrienol, wherein the vitamin E, in particular the α-tocopherol or the tocotrienol, is present in a proportion of 0.005 to 0.25 wt. %. % based on the total weight of the hollow fiber membrane, characterized in that the hollow fiber membrane has a sieving coefficient for albumin, determined according to DIN EN ISO 8637-3:2018, of 50 to 100%, or characterized in that the hollow fiber membrane has a sieving coefficient for immunoglobulin M, determined according to DIN EN ISO 8637-3:2018, of 50 to 100%, or characterized in that the hollow fiber membrane has a sieving coefficient for low density lipoprotein, determined according to DIN EN ISO 8637-3:2018, of 80 to 100%.

The hollow fiber membrane according to the invention has a beneficially lower haemolysis activity and is therefore superior to a comparable hollow fiber membrane that does not contain vitamin E. In addition, the hollow fiber membrane according to the invention also shows a reduced tendency to blood coagulation and an improved property in the reduction of the triglyceride concentration and is therefore also superior to comparable hollow fiber membranes without vitamin E. Triglycerides are preferentially adsorbed on insufficiently hydrophilic surfaces and thus permanently deteriorate the permeation and selection properties of the filter in the course of therapy.

It is assumed that the amount of vitamin E in the hollow fiber membrane causes fixation of the polyvinylpyrrolidone at the membrane surface and thus leads to an improved, i.e. reduced haemolysis activity in large-pored hollow fiber membranes intended for the separation of blood plasma from blood. In this context, the term "large-pored" refers to hollow fiber membranes which have the above-mentioned sieving coefficients for albumin, or immunoglobulin M (IgM), or low-density lipoprotein (LDL). Preferably, the openings of the surface of the blood contact layer can have a width of 0.1 to 10 µm to effectively separate blood plasma from blood. In embodiments known in the state-of-the-art, these openings are so large that during a separation process of blood plasma from blood, blood cells can penetrate into the openings of the membrane surface of the hollow fiber membrane and be caused to burst by the process-related transmembrane pressure difference. As was determined by scanning electron microscopy, fewer blood cells penetrate the openings in the membrane surface of hollow fiber membranes according to the invention, so that a reduced hemolysis activity of the hollow fiber membrane is observed. In advantageous embodiments, the proportion of vitamin E, in particular α-tocopherol or tocotrienol, in the hollow fiber membrane is 0.01 to 0.15 wt. %, more preferably 0.03 to 0.1 wt. %, based on the total weight of the hollow fiber membrane.

For the purposes of the present application, "sieving coefficient for albumin" means the permeability of the hollow fiber membrane for albumin, determined according to DIN EN ISO 8637-3:2018. Albumin is a plasma protein with a molecular weight of 66 kDa. According to this embodiment it is possible to separate a portion of plasma proteins from blood or, in the course of cascade filtration, a selective range of blood plasma proteins from blood plasma. The hollow fiber membrane preferably has a sieving coefficient for albumin of 60 to 100%, more preferably of 70 to 100%.

Within the meaning of the present application, the term "sieving coefficient for immunoglobulin M" is to be understood as the permeability of the hollow fiber membrane for immunoglobulin M (IgM), determined according to the method DIN EN ISO 8637-3:2018. IgM is a plasma protein with a molecular weight of 950 kDa. According to this embodiment it is possible to separate a fraction of plasma proteins from blood or, in case of cascade filtration, from blood plasma that have a larger specific molecular weight range of blood plasma proteins. A hollow fiber membrane provided according to this embodiment can be used in therapies, e.g. the specific plasmapheresis, which require the separation of blood plasma according to predetermined molecular weight ranges. The hollow fiber membrane preferably has a sieving coefficient for IgM of 60 to 100%, more preferably of 70 to 100%.

Within the meaning of the present application, the term "sieving coefficient for low density lipoprotein" is to be understood as the permeability of the hollow fiber membrane for low density lipoprotein (LDL), determined according to the method DIN EN ISO 8637-3:2018. LDL is a plasma protein with a molecular weight of 2,700 kDa. According to this embodiment, it is possible to separate the entire part of plasma proteins from blood in a separation process, e.g. the non-specific plasmapheresis. A hollow fiber membrane provided according to this embodiment can be used in therapies that require the complete separation of blood plasma from blood. The hollow fiber membrane preferably has a sieving coefficient for LDL of 80 to 100%, more preferably of 90 to 100%.

Within the meaning of the present application, a "blood contact layer" is understood to as one layer of the hollow fiber membrane that constitutes a layer exposed to the patient's blood in an extracorporeal blood treatment. Advantageously, the blood contact layer has a thickness of 1 µm to 15 µm, preferably 2 to 10 µm, more preferably 3 to 6 µm, and its porous structure is designed to allow effective separation of blood plasma from blood. Preferably, the size of the pores in the blood contact layer can be 0.1 to 10 µm. Within the meaning of the present application, a 'support layer' is to be understood as a layer that provides the required mechanical stability to the hollow fiber membrane to be further processed into hollow fiber membrane filters and in sterilization processes. The thickness of the support layer is preferably 25 to 79 µm, or 30 to 77 µm or 34 to 74 µm. Preferably, the pore structures of the blood contact layer and the support layer are different. The pores of the blood contact layer are also preferably smaller than those of the support layer. The different pore structure can be selectively adjusted by the manufacturing process of the hollow fiber membranes in the non-solvent-induced phase inversion process, for example by a "dry-wet" spinning process. A temperature-induced phase inversion process is also conceivable.

Within the meaning of the present application, a "hydrophobic polymer" is to be understood as a polymer which has a solubility in water of less than 0.1 g/l. For the purposes of the present invention, the hydrophobic polymers which may be used are polysulfone (PSU), polyethersulfone (PES), polyphenylsulfone, copolymers containing sulfone groups, polyetherimide (PEI), polyamide (PA), polycarbonate (PC), polystyrene (PS), polymethylmethacrylate (PMMA), polyacrylonitrile (PAN), polyimide (PI), and polyurethane (PU). Within the meaning of the present application a "hydrophilic polymer" is understood to be a polymer which has a solubility in water of at least 1 g/l. For the purposes of the present invention, polyvinylpyrrolidone (PVP) or polyethylene glycol and copolymers thereof can be used as hydrophilic polymers. In the context of the present application, the term "solubility in water" means that the hydrophobic/hydrophilic polymer is dissolved in water and results in a solution which is optically clear by visual observation in the visible wavelength range of light, without occurrence of any turbidity, sol gel formation, flocculation or precipitation.

Within the meaning of the present application, the term "vitamin E" is to be understood as a generic term for fat-soluble substances with antioxidant effects. In particular, the term subsumes the frequently occurring vitamin E forms tocopherol, tocotrienols, tocomonoenol (T1) and MDT (marine derived tocopherols).

In an embodiment according to the first aspect, the invention is characterized in that the hollow fiber membrane consists of at least two coextruded layers, one of the at least two coextruded layers forming a blood contact layer and the other of the at least two coextruded layers forming a support layer. According to this embodiment, it is possible to provide the hollow fiber membrane with two layers and thus to improve the individual layers with respect to their function as a blood contact layer and as a support layer. In particular, layer thickness, composition and pore structure of the blood contact layer and the support layer can be worked differently. The embodiment provides the advantage that the blood contact layer is optimized with regard to hemolysis activity, while the support layer is advantageously designed with regard to mechanical stability, especially the sterilization resistance of the hollow fiber membrane.

In an embodiment according to the first aspect and the afore-mentioned embodiment, the invention is characterized in that the blood contact layer is the inner layer and the support layer is the outer layer of the hollow fiber membrane. By means of such an embodiment, the blood contact layer can be designed particularly precisely with respect to the separation behaviour.

In a further embodiment according to the first aspect, the invention is characterized in that the hydrophobic polymer comprises or consists of polysulfone and/or that the hydrophilic polymer comprises or consists of polyvinylpyrrolidone. The term "polysulfone" is understood as a polymer which has a sulfone group in the main or side chain of the polymer. Within the meaning of the present application, the term polysulfone (PSU) is understood to be a generic term for all polymers containing sulfonic groups. Typical representatives of polysulfone based materials are polysulfone (PSU), polyethersulfone (PES), polyphenylsulfone and copolymers containing sulfone groups. Polysulfone materials have proven to be superior to other materials in the manufacture of blood treatment membranes because they are steam-sterilizable and have good hemocompatibility properties.

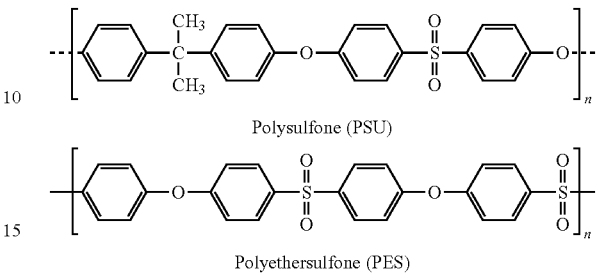

Polysulfone (PSU)

Polyethersulfone (PES)

In a further version according to the first aspect, the hollow fiber membrane is characterized in that the polyvinylpyrrolidone content in the hollow fiber membrane is 4 to 9 wt. %, preferably 5-8%, more preferably 5-7%. Due to the polyvinylpyrrolidone content, the hollow fiber membrane has a hydrophilic character for blood. In this context, the term "hydrophilic hollow fiber membrane" means that the hollow fiber membrane can be completely wetted by blood without the need for prior hydrophilizing processes, e.g. pressure rinsing of the hollow fiber membrane with water. An easy wettability of the hollow fiber membrane with blood enables an effective separation of blood plasma or parts of blood plasma in the plasma separation process.

The term "polyvinylpyrroldone" defines a polymer containing repeating units of vinylpyrrolidone or derivatives thereof. PVP is a water-soluble polymer and improves the hemocompatibility of hollow fiber membranes made of polysulfone, since it hydrophilizes the hydrophobic polysulfone material and thus makes it more wettable for blood. Other co-monomers may be added to the vinylpyrrolidone, for example vinyl acetate polymers. These co-polymers have the advantage that they form particularly stable hydrogels. Surprisingly, the tendency to hemolysis was found to be particularly reduced when the PVP content is set so high.

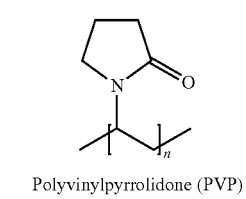

Polyvinylpyrrolidone (PVP)

In a further embodiment according to the first aspect, the hollow fiber membrane is characterized exhibiting an inner diameter of 250 to 400 μm, preferably 280 to 380 μm, more preferably 300 to 360 μm. If the internal diameter is too small, the transmembrane pressure increases and thus the tendency to haemolysis increases, if the internal diameter is too large, the filtration performance decreases.

In a further embodiment according to the first aspect or one of the afore-mentioned embodiments of the first aspect, the hollow fiber membrane is characterized in that the wall thickness ranges from 40 to 80 μm. The wall thickness causes a favorable strength of the hollow fiber membrane. A wall thickness greater than approx. 80 μm has a negative effect on the filtration properties of the hollow fiber membrane. Advantageous wall thicknesses are 50 to 70 µm, more preferably 60 to 70 µm.

Figure 4:
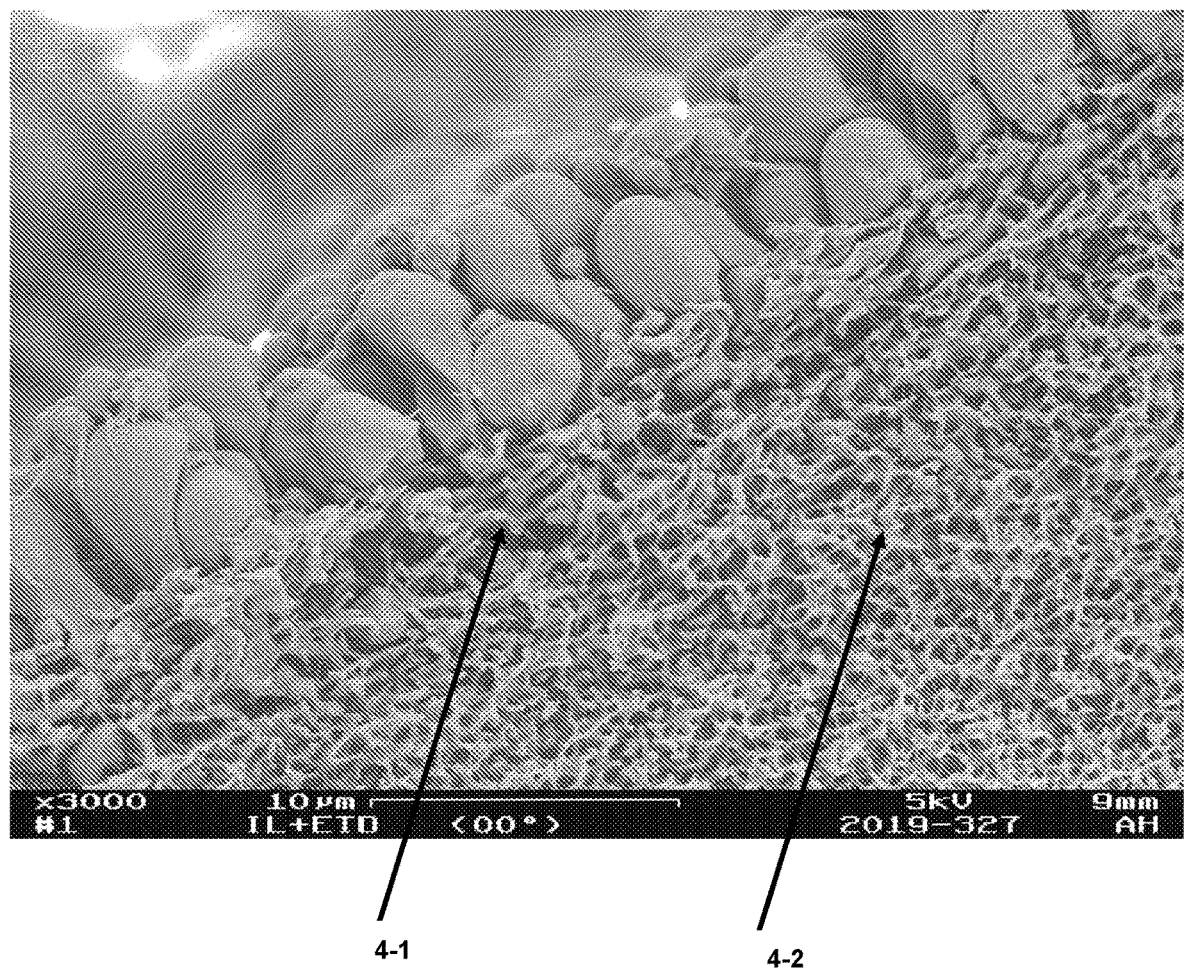

In a further embodiment according to at least one of the afore-mentioned embodiments of the first aspect, the hollow fiber membrane is characterized in that the blood contact layer in a near-surface layer, determined by XPS measurement, has a polyvinylpyrrolidone content of 30 to 60 wt. %, preferably of 35 to 55 wt. %, more preferably of 40 to 50 wt. %. The polyvinylpyrrolidone content in a near-surface layer of the blood contact layer can be adjusted in the production of the hollow fiber membrane by the preset ratio of the hydrophobic polymer, preferably PSU, and the hydrophilic polymer, preferably PVP, in the spinning mass. In one embodiment, the composition of the spinning mass from which the blood contact layer results is selected such that a higher proportion of PVP is present compared to the support layer. It is assumed that the proportion of vitamin E in the spinning mass, which forms the blood contact layer of the hollow fiber membrane, fixes the PVP in a surface-near layer during the manufacturing process of the hollow fiber membrane and thus results in a high proportion of PVP in the blood contact layer, in particular the near-surface of the blood contact layer. Electron microscopic images according to FIG. 4 and FIG. 5 showed that fewer blood cells penetrate the openings of the blood contact layer in a hollow fiber membrane according to the invention than in a comparable hollow fiber membrane which does not contain vitamin E. The surprisingly different findings correlate with the observed lower hemolysis activity of the hollow fiber membrane according to the invention compared to a reference hollow fiber membrane. Obviously, the penetration of blood cells into the openings of the blood contact layer is a decisive cause for haemolysis which are observed on hollow fiber membranes for the separation of blood plasma from blood.

In a further embodiment according to at least one of the afore-mentioned embodiments of the first aspect, the hollow fiber membrane is characterized in that the near-surface layer of the hollow fiber membrane opposite the blood contact layer has a polyvinylpyrrolidone content of 25 to 50 wt. %, preferably of 30 to 45 wt. %, more preferably of 30 to 40 wt. %, determined by XPS measurement. This embodiment ensures low adsorption of plasma components even on the surface opposite the blood contact side.

In a further embodiment in accordance with at least one of the aforementioned embodiments of the first aspect, the hollow fiber membrane is characterized in that the difference in PVP content in wt. % between the near-surface layer of the blood contact side and the near-surface layer of the surface of the hollow fiber membrane opposite the blood contact side, determined by XPS measurement, has a value of at least 5 wt. %, preferably at least 7%, more preferably at least 10 wt. %. This embodiment has a particularly low total adsorption of blood and plasma components.

In another embodiment, the hollow fiber membrane is characterized in that the blood contact layer forms an inner layer of the hollow fiber membrane. This embodiment accordingly reduces the tendency to hemolysis compared to embodiments wherein the blood contact layer forms an outer layer of the hollow fiber membrane. Furthermore, such embodiments are less prone to accumulate amounts of residual blood in the filter after the end of therapy.

In a further version according to the first aspect, the hollow fiber membrane is characterized in that the thickness of the blood contact layer is 1 to 15 µm. The layer thickness of the blood contact layer contributes only little to the mechanical stability of the hollow fiber membrane due to its high porosity. The layer thickness of the blood contact layer should be not be too large in comparison to the support layer in order not to impair the strength of the hollow fiber membrane.

In a second aspect, the invention relates to a method for producing the hollow fiber membrane according to the invention, wherein the method comprises the following process steps:

Providing a spinning mass A comprising 15 to 25 wt. % of a hydrophobic polymer, 4 to 8 wt. % of a hydrophilic polymer, 0.2 to 2% of a polar protic substance and 0.001 to 0.05 wt. % of vitamin E, in particular α-tocopherol or tocotrienol, 83.799 to 64.95 wt. % of a polar aprotic solvent, Providing a spinning mass B comprising 8 to 12 wt % of a hydrophobic polymer, 3 to 7.5 wt % of a hydrophilic polymer, 0.001 to 0.05 wt % of vitamin E, in particular a α-tocopherol or tocotrienol, 88.999 to 81.95 wt % of a polar aprotic solvent, Providing an inner precipitant comprising 70 to 90 wt % of a polar aprotic solvent and 10 to 30 wt % of a polar protic mixed liquid, Coextruding spinning mass A, spinning mass B and the inner precipitant through a spinning nozzle to form a spinning yarn, the inner precipitant being extruded through a central bore of the spinning nozzle, spinning mass B being extruded through a first concentric annular slit surrounding the central bore, spinning mass A being extruded through a second concentric annular slit surrounding the first concentric annular slit and the central bore of the spinning nozzle, Passing the spinning yarn through a spinning gap, Introduction of the spinning yarn into a precipitation bath and Precipitation of the spinning yarn to form a hollow fiber membrane.

The manufacturing process is based on a so-called "dry-wet" spinning process. In a "dry-wet" process, a spinning mass is extruded through a spinning nozzle, passed through a dry spinning gap and is subsequently introduced into a precipitation bath. A "spinning gap" refers to a vertical section between the outlet opening of the spinning nozzle and the precipitation bath, through which the extruded spinning yarn passes before it is introduced into the precipitation bath. A "spinning mass" is a homogeneous polymer solution. A "spinning yarn" is understood to be the spinning mass extruded from the nozzle, which has not yet formed the final membrane structure. In the present method for producing the hollow fiber membrane, the spinning process is carried out by coextrusion of two spinning masses and an inner precipitant. The spinning mass A forms the support layer of the hollow fiber membrane. Spinning mass B forms the blood contact layer of the hollow fiber membrane. The composition of the spinning masses A and B and the composition of the inner precipitant as well as the selection of the spinning parameters such as temperature control of the spinning mass, temperature control of the spinning nozzle, spinning speed, height of the spinning gap result in the porous characteristics of the hollow fiber membrane. In this context, a "polar aprotic" solvent is understood as a solvent which dissolves the hydrophobic and the hydrophilic polymer in the spinning mass, but only has a low CH acidity. Typical representatives of polar aprotic solvents are dimethylsulfoxide, (DMSO), dimethylformamide (DMF), dimethylacetamide (DMAc) and N-methylpyrrolidone (NMP). A "polar protic substance" is understood as a CH-acidic substance. Preferred representatives are water, ethanol, or methanol.

The temperature of the precipitation bath is adjusted to 50 to 80° C., in particular to 60 to 70° C. The temperature control of the precipitation bath allows the adjustment of an atmospheric humidity in the spinning gap, so that the pore formation on the outside of the spinning yarn is supported. The precipitation bath preferably consists of aqueous solutions, especially preferred is water containing less than 5 wt. % of one of the aprotic polar solvents mentioned.

The proportion of the individual components in the spinning mass are decisive for the viscosity of the spinning mass. The viscosity of spinning mass solution A is 7000 to 18000 mPa·s, in particular 9000 to 14000 mPa·s. Spinning solution A typically contains 15 to 25 wt. %, preferably 18 to 23 wt. %, more preferably 19 to 21 wt. %, of a hydrophobic polymer, in particular polysulfone (PSU), 4 to 8 wt. %, preferably 5 to 7 wt. %, more preferably 5 to 6 wt. %, of a hydrophilic polymer, in particular polyvinylpyrrolidone (PVP), 0.02 to 2 wt. %, preferably 0.5 to 1.5 wt. %, more preferably 0.8 to 1.2 wt. % of a polar protic substance, preferably water, 0.001 to 0.05 wt. %, preferably 0.005 to 0.03 wt. %, more preferably 0.008 to 0.02 wt. % of vitamin E, in particular α-tocopherol or tocotrienol, and 80.799 to 64.95 wt. %, or 76.495 to 64.95 wt. %, or 75.192 to 64.95 wt. % of a polar aprotic solvent, preferably DMAc. Preferred are e.g. 17.5 to 22.5 wt. % PSU, 5 to 8 wt. % PVP, 0.008 to 0.02 wt. % vitamin E, especially α-tocopherol or tocotrienol, the remainder up to 100 wt. % is DMAc.

The viscosity of spinning mass solution A was determined using a rotational viscometer (VT 550 from Haake, Germany) at 40° C. in step r.2 (6 rpm) with a rotating body "MV1 (MV-DIN)" from Haake (shear rate 7.7/s).

The viscosity of spinning mass solution B is preferably less than 1000 mPa-s and contains 8 to 12 wt. %, preferably 9 to 11 wt. %, more preferably 9.5 to 10.5 wt. % of a hydrophobic polymer, preferably PSU, 3 to 7.5 wt. %, preferably 4.5 to 7 wt. %, more preferably 5 to 6 wt. % of a hydrophilic polymer, preferably PVP, 0.001 to 0.05 wt. %, preferably 0.005 to 0.03 wt. %, more preferably 0.008 to 0.02 wt. % of vitamin E, in particular α-tocopherol or tocotrienol and 88.999 to 81.95 wt. %, or 86.495 wt. %, or 85.492 wt. % of a polar aprotic solvent, preferably DMAc. Preferably 9 to 10 wt. % PSU, 5 to 6 wt. % PVP, 0.008 to 0.02 wt. % vitamin E, especially α-tocopherol or tocotrienol, the remainder up to 100 wt. % being DMAC.

The viscosity of spinning mass solution B was determined by means of a rotational viscometer (VT 550 from Haake, Germany) at 40° C. in step r. 3 (30 rpm.) with a rotating body "MV1 (MV-DIN)" from Haake (shear rate 38.7/s).

The different viscosity of the two spinning masses A and B causes a different porosity in the two coextruded layers. Spinning mass A results in the support layer of the hollow fiber membrane, spinning mass B results in the blood contact layer of the hollow fiber membrane.

With regard to the viscosity of spinning mass solution B, this should typically not be below 300 mPa-s, otherwise spinning mass B can no longer be extruded uniformly.

In the context of the invention, the thickness of the membrane wall and the inner diameter of the hollow fiber membrane can be varied. The thickness of the membrane wall of the hollow fiber membrane according to the invention is typically 40 to 80 μm, preferably 50 to 70 μm, more preferably 60 to 70 μm.

With an internal precipitating agent comprising or consisting of 70 to 90 wt. %, preferably 75 to 85 wt. %, more preferably 78 to 82 wt. % of a polar aprotic solvent, preferably DMAc, and 10 to 30 wt. %, preferably 25 to 15 wt. %, more preferably 22 to 18 wt. % of a polar mixed liquid, preferably water, the desired porous structure of layer B is formed by means of the process according to the invention. For the purposes of the present invention, a "polar protic mixed liquid" is a CH-acidic liquid, preferably water, ethanol or methanol.

In a version according to the second aspect, the process is characterized in that the spinning masses A and B are tempered to 60 to 80° C., preferably 65 to 75° C. and/or the internal precipitant is tempered to 50 to 70° C., preferably 55 to 65° C.

The speed of membrane formation in the spinning process is influenced by the spinning speed. The spinning speed is 300 to 500 mm per second, preferably 350 to 480 mm per second, more preferably 380 to 430 mm per second. The "spinning speed" indicates the speed at which the spinning yarn is passed through the spinning gap. Furthermore, the height of the spinning gap has an influence on the membrane formation in the spinning process. In the process according to the invention, the spinning gap is 5 to 80 mm, preferably 10 to 50 mm, further preferably 15 to 40 mm.

Furthermore, flushing processes of the hollow fiber membrane are combined to the spinning process. The precipitated hollow fiber membrane is passed through several rinsing baths and rinsed in the process. The temperature of the rinsing baths is typically in the range of 60 to 80° C. In the rinsing baths, the hollow fiber membrane is freed from solvent and excess PVP that is not fixed in the hollow fiber membrane after precipitation. The hollow fiber membrane is freed as much as possible from this part of the polyvinylpyrrolidone, since otherwise PVP that can be eluted from the hollow fiber membrane can enter the bloodstream in a therapeutic treatment.

After the rinsing process the hollow fiber membrane is dried. This is preferably done at 90 to 160° C., preferably at 100 to 150° C., further preferably at 120 to 140° C.

In a further embodiment according to the second aspect, the method is characterized in that
  the hydrophobic polymer of spinning mass A comprises or consists of polysulfone, and/or in that
  the hydrophilic polymer of spinning mass A comprises or consists of polyvinylpyrrolidone, and/or that
  the polar protic substance of spinning mass A comprises or consists of water, and/or that
  the polar aprotic solvent of spinning mass A comprises or consists of dimethylsulfoxide, dimethylformamide, dimethylacetamide, N-methylpyrrolidone or mixtures thereof, and/or that
  the hydrophobic polymer of spinning mass B contains or consists of polysulfone, and/or that
  the hydrophilic polymer of spinning mass B comprises or consists of polyvinylpyrrolidone, and/or that
  the polar aprotic solvent of spinning mass B comprises or consists of dimethylsulfoxide, dimethylformamide, dimethylacetamide, N-methylpyrrolidone or mixtures thereof, and/or that
  the polar protic mixed liquid of the internal precipitant water has or consists of water.

In a further version according to the second aspect, the process is characterized in that the internal precipitant does not contain a hydrophilic polymer. Surprisingly, it was found that a high concentration of the hydrophilic polymer, such as PVP, can be produced in a near-surface layer of the blood contact layer according to the method of the invention without having to add a corresponding hydrophilic polymer, such as PVP, to the inner precipitant.

The hollow fiber membranes are sterilized subsequent to their production. Hollow fiber membranes are first used for the manufacture of hollow fiber membrane filters. The manufacture of hollow fiber membrane filters is known to skilled person and will not be explained in detail here. In this context, reference is also made to the method description contained herein, which describes the manufacture of experimental hollow fiber membrane filters.

The method for sterilizing the hollow fiber membrane filters according to the invention is also known in the art. The sterilization of a hollow fiber membrane described here was carried out according to the method described in detail in DE102016224627 A1.

In a third aspect, the invention relates to a sterile hollow fiber membrane filter comprising a plurality of hollow fiber membrane filters according to the first aspect of the invention or produced by a method according to the second aspect of the invention, wherein the hollow fiber membrane filter has been sterilized by a steam sterilization process.

DESCRIPTION OF THE INVENTION BASED ON THE FIGURES

Methods

In the following, the methods for characterizing the hollow fiber membranes according to the invention and the comparative hollow fiber membranes are described.

1. Manufacture of a Hollow Fiber Membrane Filter

Hollow fiber membranes with an inner diameter of 330 µm and a wall thickness of 65 µm are used for the manufacture of a hollow fiber membrane filter. The hollow fiber membranes are bundled and sealed at the ends in the housing of the hollow fiber membrane filter with a curable potting mass material in such that a first space is formed which encloses the interior of the hollow fiber membranes ("blood side"), and a second space ("filtrate side") is formed which encloses the space between the hollow fiber membranes. The potting material used is polyurethane from BASF (Elastogran) (polyol C6947 and isocyanate 136 20). The housing diameter, the potting height at the bundle ends and the active length of the hollow fiber membrane correspond to the commercially available plasma filters "plasmaFlux P1" and "plasmaFlux P2" from Fresenius Medical Care, Bad Homburg, Germany. The active length of a hollow fiber membrane is the length of the hollow fiber membrane without potting, which is available for the determination of permeation properties such as sieving coefficient, hemocompatibility data and ultrafiltration coefficient. The active membrane area resulting from the active hollow fiber membrane length of the hollow fiber membrane filters investigated is 0.3 and 0.6 m² in two different embodiments. The filter is steam sterilized according to DE102016224627.

2. Method of Measurement for Determining the Polyvinylpyrrolidone Content in the Hollow Fiber Membrane From a sterile hollow fiber membrane filter, as described in method 1, 1 g of the membrane is removed and placed in an isothermal generator (Porotec, Hofheim/Ts, Germany). The measurement is started at 0% relative humidity, waiting until the weight is constant. Afterwards, the humidity is increased in 10% steps, waiting until the weight is constant until the relative humidity of 60% is reached. The measurement is performed at 25° C. and at 40° C.

For the determination of the PVP content, the water absorption of a granulate of polysulfone and a powder of PVP, as used in the embodiments, was determined for comparison. The results are shown in the following table:

|  | PVP-free pure polysulfone hollow fiber membrane | pure PVP |
|---|---|---|
| Water absorption 25° C./ 60% relative humidity | 0.55 wt. % | 24.80 wt. % |
| Water absorption 40° C./ 60% relative humidity | 0.54 wt. % | 20.70 wt. % |

The determination of the PVP content of a hollow fiber membrane sample, which is examined at a test temperature of 25° C., is carried out according to formula 1:

$$C(PVP) = \frac{\text{water absorption (\%) at } 25°C. - 0.55\%}{24.80\%} \quad \text{Formula 1}$$

The determination of the PVP content of a hollow fiber membrane sample, which is examined at a test temperature of 40° C., is carried out according to formula 2:

$$C(PVP) = \frac{\text{water absorption (\%) at } 40°C. - 0.54\%}{20.70\%}. \quad \text{Formula 2}$$

3. Exposure of Test Blood (Haemolysis Test)

For the Determination of the hemocompatibility of the hollow fiber membranes under investigation, human test blood is brought into contact with the hollow fiber membranes. Hemocompatibility in this context stands for the hemolysis and adsorption properties (triglyceride and platelet adsorption) of the hollow fiber membranes. For this purpose, 500 ml of human whole blood is collected with a 17G (1.5 mm) needle from healthy blood donors who are not taking any medication that could affect blood coagulation or platelet properties. The collected blood is heparinized as described below. 750 IU heparin diluted in 50 ml of physiological saline solution is placed in a blood bag. Whole blood is added to the provided heparin solution and is mixed to give a heparin concentration of 1.5 IU per ml of the mixture. Within 30 min after the blood donation, the method for determining the hemocompatibility of the hollow fiber membranes is started.

The hollow fiber membranes to be investigated are examined in a hollow fiber membrane filter in an apparatus which is schematically shown in FIG. 1. As shown in FIG. 1, apparatus 1-1 includes a hollow fiber membrane filter to be investigated for plasma separation 1-2, with a construction as described in method 1. The apparatus further comprises a tubing system 1-3, a peristaltic pump 1-4, a blood sampling site 1-5, a reservoir for blood 1-6, a pressure sensor 1-7 at the blood outlet 1-8 of the hollow fiber membrane filter 1-2 and a pressure sensor 1-9 at the blood inlet 1-10 of the hollow fiber membrane filter 1-2. 113 ml of the heparinized blood as described above was used for the determination. The blood was pumped through the tubing system 1-3 (material: PVC, manufacturer Fresenius Medical Care, Germany) through the hollow fiber membrane filter 1-2 with the aid of the peristaltic pump 1-4 (manufacturer: Fresenius Medical Care, Germany) through the apparatus 1-1. A new hose system was used for each measurement. The entire apparatus 1-1 was rinsed with a 0.9% (w/v) physiological saline solution for 30 min. before the measurement. To fill the apparatus with blood, the rinsing solution is displaced at low pump speed with blood introduced into the apparatus and drained until the apparatus was filled with pure blood or the filtrate side of the hollow fiber membrane filter was filled with plasma. The filling quantity with blood was 113 ml. The displaced solution was discarded.

The filtered blood plasma is discharged from the hollow fiber membrane filter and is re-introduced into the blood downstream of the blood outlet 1-8 of the hollow fiber membrane filter 1-2. The exposure experiment is carried out at 37° C., e.g. in an incubator (Memmert, Germany), for a predetermined period. At the start of the measurement and after predetermined time, samples are taken at the blood sampling site 1-5 are taken. The pressure at the blood outlet 1-8 and at the blood inlet 1-10 is measured to ensure constant conditions during the determination. In case of significant pressure changes, the measurement must be discarded. The blood was pumped through the apparatus at a flow rate of 200 ml/min.

4. Measuring Method for Determining the Transmembrane Pressure During a Filtration Test The transmembrane pressure (TMP) is determined according to the pressure gauges P1, P2 and P3 shown in FIG. 1. Formula 3 is applied:

$$TMP = \frac{(P1 + P2)}{2} - P3 \text{ [in mmHG]} \qquad \text{Formula 3}$$

5. Measuring Method for the Determination of the Thrombocyte Concentration in Blood For the determination of the thrombocyte concentration in the blood, blood samples taken at predetermined times before and after the exposure test are evaluated. The analysis data are determined with the K-4500 device from Symex (blood count determination) according to the electrical resistance measuring principle. A capillary suitable for erythrocytes and thrombocytes is used in a measuring unit of the device. The measuring transformers and electrodes are immersed in an electrically conductive liquid so that a constant electric current can flow between the inner and outer electrode. The electrically non-conductive thrombocytes are drawn through the opening of the measuring transducer. If a cell passes through, it displaces the dilution solution. Since the electrical resistance of the cell is higher than that of the dilution solution, a voltage change proportional to the resistance change occurs. The voltage increase is proportional to the cell volume, so that a differentiation between erythrocytes and thrombocytes is also possible. The determined thrombocyte count is a measure of the blood coagulation that occurs at the blood contact layer of the hollow fiber membrane. A high adsorptive loss of thrombocytes increases the tendency to coagulate and thus the tendency to form blockages in the filter.

6. Measuring Method for the Determination of the Haemoglobin Value (HGB)

Blood plasma samples taken at predetermined times before and after the exposure experiment are evaluated. The HGB is measured using the sodium lauryl sulfate (SLS) method. The hemoglobin concentration is determined at a wavelength of 555 nm in a HGB cuvette. A spectrophotometer EVOLUTION 210 (Thermo Fisher Scientific, Dreieich) with a 7-fold cell holder is used for this purpose in the "free hemoglobin" measuring method. Disposable cells 1.5 ml, semi-micro PMMA from Brand, Gießen, Germany, are used. The haemoglobin comes from blood cells, especially the erythrocytes, which are destroyed during the separation of the blood plasma. The determined haemoglobin value is a measure for the haemolysis activity of the hollow fiber membrane under investigation. The lower the determined haemoglobin value, the lower the haemolysis activity of the hollow fiber membrane. Free hemoglobin is a measure of the destruction of red blood cells.

7. Measuring Method for the Determination of the Triglyceride Concentration

Blood samples taken at predetermined times before and after the exposure test are evaluated and the triglyceride concentration in the blood is determined. The percentage loss of triglyceride is determined from the difference. The triglyceride concentration is determined by the following method: A whole blood sample is drawn into a 1.2 ml Li-Heparin monovette (Ref. No. 06.1666.001 of the Sarstedt company, Nümbrecht) and centrifuged for 10 min at 4000 rpm. The blood plasma is transferred into a sample vessel. The triglyceride is converted and made available for a color reaction. The method according to Wahlefeld, using lipoprotein lipase in complete hydrolysis to glycerol with subsequent oxidation to dihydroxyacetone phosphate and hydrogen peroxide. The resulting hydrogen peroxide forms a red dye under the catalytic action of peroxidase with 4-aminophenazone and 4-chlorophenol in an endpoint reaction according to Trinder, which can be photometrically determined proportionally to the triglyceride. The Cobas INTEGRA 400 plus analyser (Roche Diagnostic, Mannheim, Germany) with the "TRIGL" method is used for this purpose.

The method can be used to calculate the drop in concentration of triglycerides in mg/dl after the exposure time.

8. Measuring Method for the Determination of Erythrocytes on the Membrane Surface by Scanning Electron Microscopy At the end of an exposure experiment, the pump speed is increased until a desired transmembrane pressure (TMP) is reached. In the case of the comparative example of a hollow fiber membrane described below, a TMP of 130 mmHg was set, in the case of the working example described below, a TMP of 183 mmHg was set. The experiment is then interrupted, and the filter is washed with isotonic saline solution. Individual hollow fiber membranes are taken from the hollow fiber membrane filter. The removed hollow fiber membranes are opened so that the inner surface of the hollow fiber membranes is exposed and can be examined with the scanning electron microscope. Scanning electron microscopy is performed at an acceleration voltage of 5 kV and a 3000-fold magnification. A qualitative description of the penetration behavior of the erythrocytes into the membrane is performed.

9. Measuring Method for the Determination of Polyvinylpyrrolidone in a Near-Surface Layer (XPS)

The content of polyvinylpyrrolidone in a near-surface layer of the blood contact layer was determined by photoelectron spectroscopy (XPS or ESCA). This method is used to determine the amount of polyvinylpyrrolidone in a layer of 5 to 10 nm adjacent to the surface of the blood contact layer of the hollow fiber membrane. This layer, which is examined by the XPS method, is referred to as the "near-surface layer" for the purposes of the present application. To examine the near-surface layer, predetermined measurement conditions are set for this purpose.

The method is explained in the following. A hollow fiber membrane is cut longitudinally with a scalpel so that the inner surface of the hollow fiber membrane, which represents in this case is the surface of the blood contact layer, is exposed. This sample is fixed on a sample plate and is placed in the sample chamber. The following measuring conditions are set:

Apparatus: Thermo VG Scientific, Type K-Alpha
Excitation radiation: monochromatic X-ray radiation, Al Kα, 75 W
Diameter of the sample spot: 200 μm
Passing energy: 30 eV
Angle between source and analyzer: 54°.
Spectral resolution for an Ag3d signal: 0.48 eV:
Vacuum: $10^{-8}$ mbar
The charge was compensated with the help of a flood gun.

The XPS measurements were performed at Nanoanalytics in Münster, Germany. The content of PVP in the near-surface layer was determined using the values determined in atom % of nitrogen (N) and sulfur(S) by formula 4. The known molecular weights of the repeating units in PVP and polysulfone are used.

Content of PVP[in wt. %]=100*(N*111)/(N*111+ S*442)  Formula 4

Formula 4 is valid for the use of bisphenol A-based polysulfone.

For other polysulfones, the molecular weight of the repeating unit containing the sulfur must be used. In case of copolymers, the proportion of the sulfur-containing repeating unit in the copolymer must be taken into account.

The PVP content in the near-surface layer is carried out on three hollow fiber membrane samples and the mean value of these measurements is calculated.

10. Method for the Determination of Albumin, IgM, LDL-Sieving Coefficient

Figure 2:
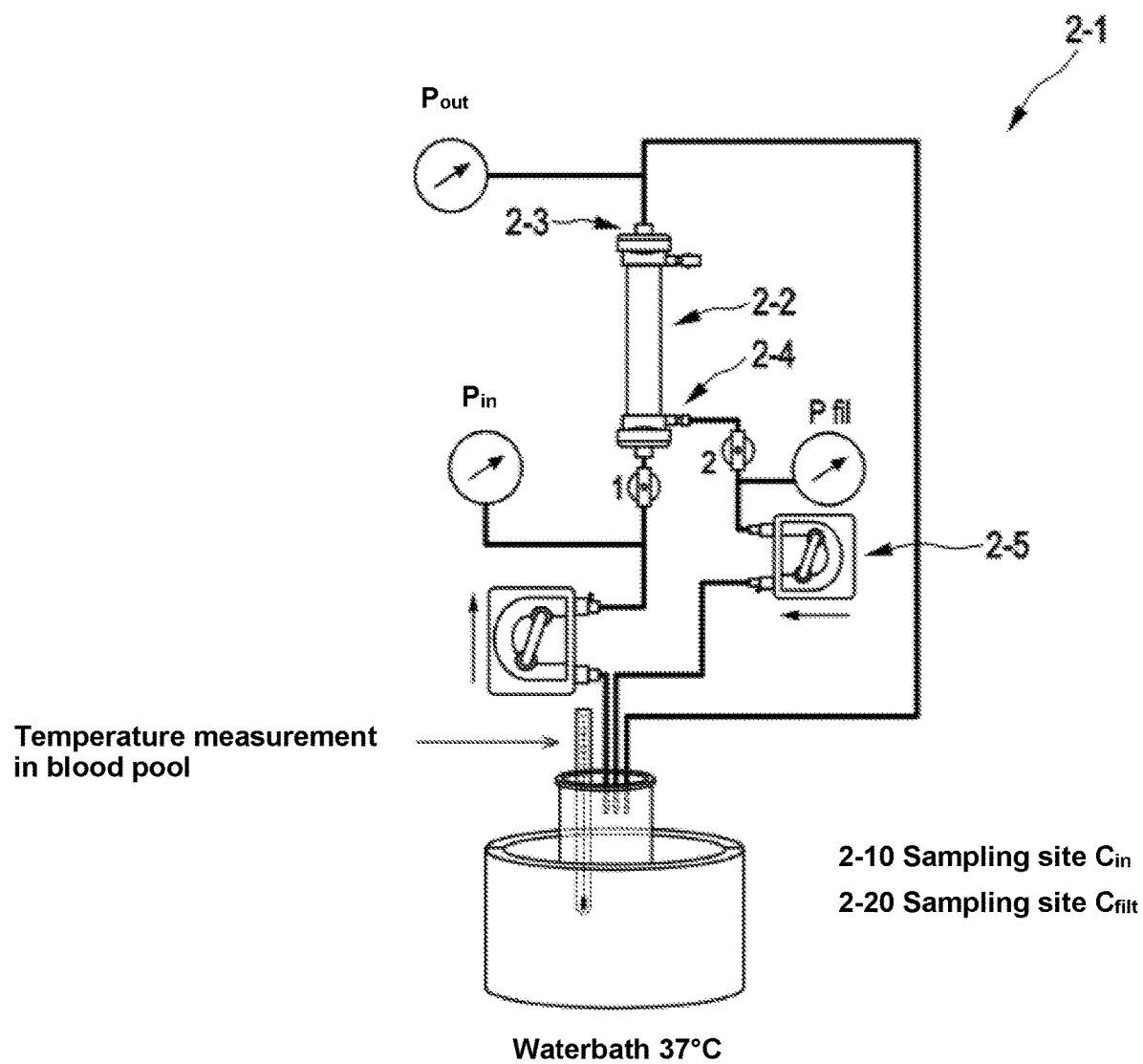

A hollow fiber membrane filter as described in method 1 is used for determining the LDL sieving coefficient. Human whole blood is used for the measurement, following the standard DIN EN ISO 8637-3:2018. For the measurement of the LDL sieving coefficient an apparatus as described in FIG. 2 is used. Before starting the measurement, the system is filled with 2 l of physiological saline solution under complete ventilation and rinsed. The hollow fiber membrane filter 2-2 is emptied on the filtrate side after the rinsing process, whereby the blood outlet 2-3 must be closed. The filtrate is collected in the measuring mode at the lower filtrate outlet 2-4. Human whole blood having the following composition is used for the measurement:

Haematocrit value (HKT) in %: 40+/−2
Total protein (TP) in %: 6+/−0.5
Triglycerides (mg/dl): 200-300
The following measuring conditions are set:

| Parameters | Active membrane area 0.3 m² | Active membrane area 0.6 m² |
|---|---|---|
| Blood volume [ml] | 500 | 1000 |
| Blood flow QB [ml/min] | 100 +/− 3 | 200 +/− 3 |
| Filtrate flow QF (ml/min) | 30 +/− 3 | 60 +/− 3 |
| Measuring time (min.) | 30 | 30 |
| Temperature of the arrangement (° C.) | 37 +/− 1 | 37 +/− 1 |

After the rinsing process, the blood side of the hollow fiber membrane filter 2-2 is filled with human whole blood. To avoid dilution effects, the first 200 ml are discarded. Then the whole blood is circulated in the apparatus 2-1. After 10 min, the filtrate pump 2-5 is started so that blood plasma is transferred to the filtrate side. After a further circulation time of 30 min under filtrate accumulation, the pressure values are recorded, the samples are taken at the sampling sites 2-10 (blood inlet) and 2-20 (filtrate) and the respective concentrations of LDL and IgM and albumin are determined. For this purpose, the automatic analyser "Cobas Integra 400 plus" from Roche Diagnostic is used with the corresponding specified method.

The sieving coefficient S is calculated according to formula 5:

$$S = \frac{C_F}{C_{in}} * 100[\%] \quad \text{Formula 5}$$

$C_F$=concentration of the analyte in the filtrate
$C_{in}$=concentration of the analyte in blood at the filter inlet The transmembrane pressure (TMP) is determined according to formula 6:

$$TMP = \frac{(P_{ein} + P_{aus})}{2} - P_F [\text{in mmHg}] \quad \text{Formula 6}$$

EXAMPLES

Working Example: Method of Producing of a Hollow Fiber Membrane According to the Invention Spinning mass A, spinning mass B and an inner precipitant medium are provided for the production of a hollow fiber membrane according to the invention. The spinning mass A is prepared by mixing 20 wt. % polysulfone (Solvay Udel 3500, LCD), 6 wt. % polyvinylpyrrolidone (ISP, PVP K90), 1 wt. % water, 0.01 wt. % vitamin E and 72.99 wt. % dimethylacetamide (DMAc). The spinning mass B is prepared by mixing 10 wt. % of polysulphone, 5.5 wt. % of polyvinylpyrrolidone, 0.01 wt. % of vitamin E and 84.49 wt. % of DMAc. The spinning masses are tempered to 72° C. while carefully degassing them until constant. Consistency is achieved when no more gas bubbles appear over a period of one hour. For the spinning process the spinning masses are tempered to 70° C.

The internal precipitant consists of 80 wt. % DMAc and 20 wt. % water. For the spinning process the precipitant is tempered to 60° C.

A spinning nozzle as described in DE10211051 was used. For the spinning process, the inner precipitant, spinning mass A and spinning mass B were coextruded through the spinning nozzle to form a spinning yarn. The precipitant was extruded through the central bore of the spinning nozzle. Spinning mass B was extruded through the first concentric annular slit surrounding the central bore of the spinning nozzle. Spinning mass A was extruded through the second concentric annular slit surrounding the first concentric annular slit and the central bore of the spinning nozzle. The slit width of the annular slit and the diameter of the central bore are chosen so that a hollow fiber membrane with the geometric dimensions described herein can be obtained.

The spinning block and thus the spinning nozzle were tempered to 60° C. for the spinning process. The extruded spinning yarn was passed through a spinning gap of 20 mm at a spinning speed of 400 mm per second. The temperature of the precipitation bath (water) was 65° C.

The hollow fiber membrane obtained by precipitation in the precipitation bath is rinsed in 6 water baths and dried at 130° C. for 10 minutes. The hollow fiber membrane has an inner diameter of 330 µm, the wall thickness was 65 µm, the layer thickness of the selective inner layer obtained from the spinning mass B, which is also the blood contact layer, was 4 µm. The hollow fiber membrane is wound up and bundled and processed into hollow fiber membrane bundles with 1296 or 2592 hollow fiber membranes.

Comparative Example: Production of a Hollow Fiber Membrane

Compared to the production of the working example, spinning mass A and spinning mass B were provided without vitamin E. Consequently, the proportion of DMAc in spinning mass A was 73 wt. %, the proportion of DMAc in spinning mass B was 85 wt. %. The respective proportions of PSU, PVP and water in spinning masses A and B were maintained. All other parameters of the hollow fiber membrane production of the working example were also maintained.

The hollow fiber membranes from example 1 and comparison example 1 were processed into hollow fiber membrane filters with the construction described in method 1 and also sterilized by steam sterilization as in the working example.

Results

The hollow fiber membranes of the example and the comparison example were examined according to the methods described above. The results are shown in Table 1:

TABLE 1

|  | Working Example | Comparative example |
|---|---|---|
| PVP content [wt. %], sterile hollow fiber membrane filters [wt. %]. | 6.6 | 2.0 |
| PVP content in the near-surface layer of the blood contact layer [weight %]. | 47.7 | 25.2 |
| PVP content in the near-surface layer of the outer surface of the hollow fiber membrane [wt. %]. | 24.6 | 22.6 |
| LDL sieving coefficient [%] | 94 | 92 |
| Waste triglyceride concentration [mg/dl] after 4 h | 53 | 114 |
| Thrombocyte concentration in the haemolysis test [%] after 2 h | 57 | 5.8 |
| Free haemoglobin in the haemolysis test after 4 h, hollow fiber membrane filter, membrane area: 0.3 m² in mg/dl | 37 | 46 |
| Free haemoglobin in the haemolysis test after 4 h, hollow fiber membrane filter, membrane area: 0.6 m² in mg/dl | 59.5 | 65.5 |

The total content of PVP in the hollow fiber membrane of the working example is significantly increased compared to the comparative example. Furthermore, the values regarding the decrease of the triglyceride concentration, the thrombocyte concentration in the hemolysis test and the free hemoglobin in the working example are significantly improved compared to the comparative example. Based on the results, it is clear that the hollow fiber membrane worked according to the working example has a lower haemolysis activity and a lower tendency to platelet and triglyceride adsorption than the hollow fiber membrane worked according to the comparative example.

Figure 3:
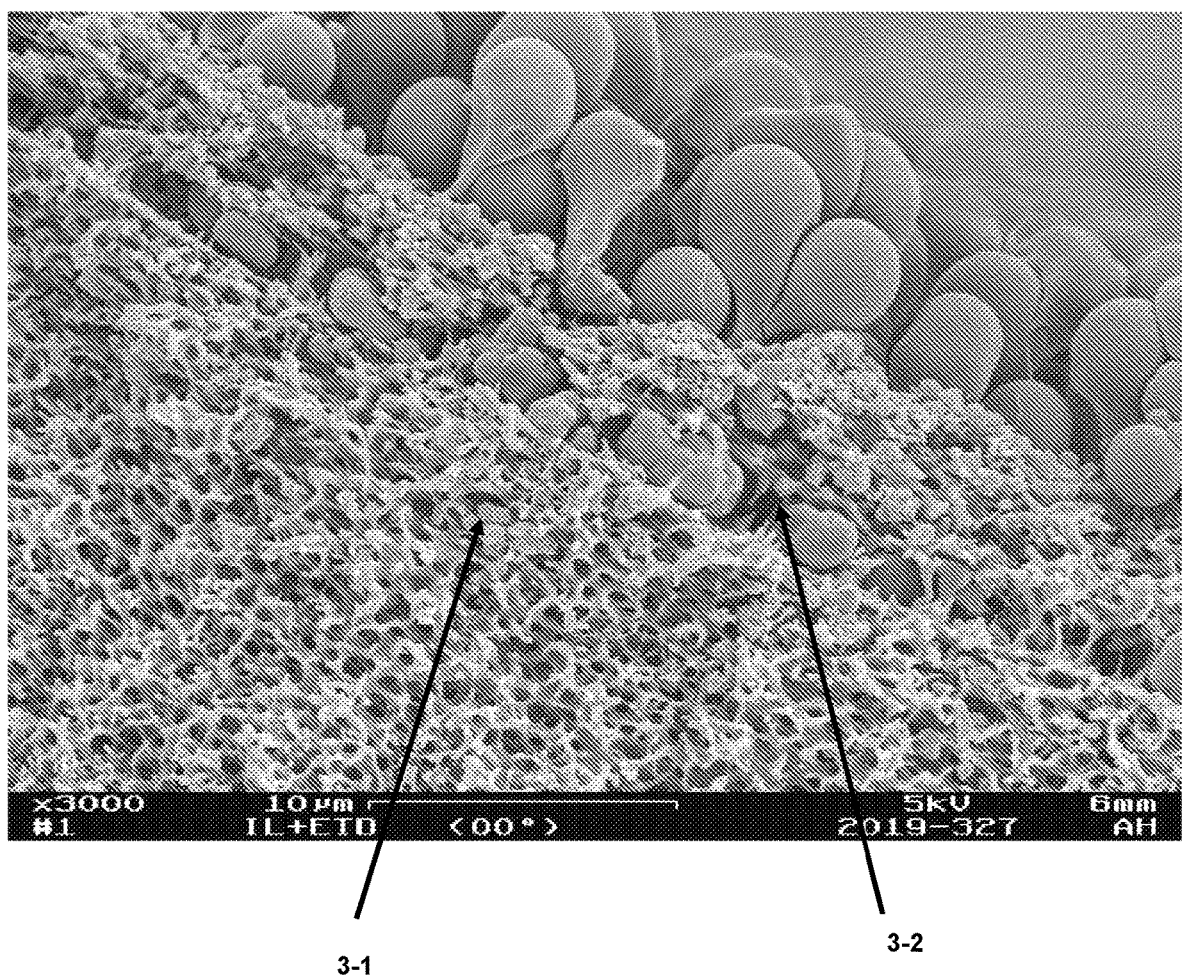

These results are also confirmed by scanning electron microscope images, which were taken after the haemolysis experiment on hollow fiber membranes of the working example and the comparison example, respectively. FIG. 3 shows a cross-section through a hollow fiber membrane according to the comparative example, which was subjected to a haemolysis test. The figure shows the support layer 3-1 and the blood contact layer 3-2. The blood cells adhering from the haemolysis test can be seen on the blood contact layer. The blood cells to be recognized are erythrocytes. FIG. 3 also shows that some of the blood cells have penetrated the blood contact layer.

FIG. 4 shows a cross-section of a hollow fiber membrane manufactured according to the working example and subjected to a haemolysis test. FIG. 4 shows the support layer 4-1 and the blood contact layer 4-2. Furthermore, as in FIG. 4, the blood cells adhering to the surface of the blood contact layer from the haemolysis test can be seen. In contrast to FIG. 3, however, no blood cells having penetrated the blood contact layer 4-2 are visible in FIG. 4. Obviously, the process of penetration of blood cells into the blood contact layer does not take place to the same extent with the hollow fiber membranes according to the invention as with the hollow fiber membrane of the comparative example. It is assumed that this process of penetration of the blood cells into the blood contact layer is decisive for the destruction of the blood cells and that the hemolysis activity of large-pored hollow fiber membranes, as used in plasmapheresis, is based to a significant extent on this process.

The invention claimed is:

1. A hollow fiber membrane for the separation of blood plasma from blood, comprising a blood contact layer and a support layer, each comprising a hydrophobic polymer, a hydrophilic polymer and vitamin E, wherein the vitamin E is present in an amount of 0.005 to 0.25 wt. % relative to the total weight of the hollow fiber membrane, the hydrophobic polymer comprises polysulfone and the hydrophilic polymer comprises polyvinylpyrrolidone, the blood contact layer in a near-surface layer, determined by XPS measurement, has a polyvinylpyrrolidone content of 35 to 60 wt. %, and wherein
   the hollow fiber membrane has a sieving coefficient for albumin, determined according to DIN EN ISO 8637-3:2018, of 50 to 100%, or wherein
   the hollow fiber membrane has a sieving coefficient for immunoglobulin M, determined according to DIN EN ISO 8637-3:2018, of 50 to 100%, or wherein
   the hollow fiber membrane has a sieving coefficient for low density lipoprotein, determined according to DIN EN ISO 8637-3:2018, of 80 to 100%.

2. The hollow fiber membrane according to claim 1, wherein the hollow fiber membrane consists of at least two coextruded layers, one of the at least two coextruded layers forming the blood contact layer and the other of the at least two coextruded layers forming the support layer.

3. The hollow fiber membrane according to claim 1, wherein the polyvinylpyrrolidone content, based on the total weight of the hollow fiber membrane, is 4 to 9 wt. %.

4. The hollow fiber membrane according to claim 1, wherein the hollow fiber membrane has a diameter of 250 to 400 µm.

5. The hollow fiber membrane according to claim 1, wherein the hollow fiber membrane has a wall thickness of 40 to 80 µm.

6. The hollow fiber membrane according to claim 1, wherein the blood contact layer forms an inner layer of the hollow fiber membrane.

7. The hollow fiber membrane according to claim 1, wherein the thickness of the blood contact layer is 1 to 15 µm.

8. A method for producing of a hollow fiber membrane according to claim 2, the method comprising the steps:
providing a spinning mass A comprising 15 to 25 wt. % of a hydrophobic polymer, 4 to 8 wt. % of a hydrophilic polymer, 0.2 to 2 wt. % of a polar protic substance and 0.001 to 0.05 wt. % vitamin E, 80.799 to 64.95 wt. % of a polar aprotic solvent;
providing a spinning mass B comprising 8 to 12 wt % of a hydrophobic polymer, 3 to 7.5 wt % of a hydrophilic polymer, 0.001 to 0.05 wt % of vitamin E, 88.999 to 81.95 wt % of a polar aprotic solvent;
providing an inner precipitant comprising 70 to 90 wt % of a polar aprotic solvent and 10 to 30 wt % of a polar protic mixing liquid;
coextruding spinning mass A, spinning mass B and the inner precipitant through a spinning nozzle to form a spinning yarn, the inner precipitant being extruded through a central bore of the spinning nozzle, spinning mass B being extruded through a first concentric annular slit surrounding the central bore, spinning mass A being extruded through a second concentric annular slit surrounding the first concentric annular slit and the central bore of the spinning nozzle;
passing the spinning yarn through a spinning gap;
introducing the spinning yarn into a precipitation bath; and
precipitating the spinning yarn to form the hollow fiber membrane.

9. The method according to claim 8, wherein the spinning mass A and the spinning mass B are tempered to 60 to 80° C. and/or the inner precipitant is tempered to 50 to 60° C.

10. The method according to claim 9, wherein the spinning gap is 5 to 80 mm and/or a spinning speed is 300 to 500 mm/s.

11. The method according to claim 9, wherein
the hydrophobic polymer of the spinning mass A comprises polysulfone, and/or
the hydrophilic polymer of the spinning mass A comprises polyvinylpyrrolidone, and/or
the polar protic substance of the spinning mass A comprises water, and/or
the polar aprotic solvent of the spinning mass A comprises dimethylsulfoxide, dimethylformamide, dimethylacetamide, N-methylpyrrolidone, or mixtures thereof, and/or
the hydrophobic polymer of the spinning mass B comprises polysulfone, and/or
the hydrophilic polymer of the spinning mass B comprises polyvinylpyrrolidone, and/or
the polar aprotic solvent of the spinning mass B comprises dimethylsulfoxide, dimethylformamide, dimethylacetamide, N-methylpyrrolidone, or mixtures thereof, and/or
the polar protic mixing liquid of the inner precipitant comprises water.

12. The method according to claim 9, wherein the inner precipitant is absent of a hydrophilic polymer.

13. A sterile hollow fiber membrane filter comprising a plurality of hollow fiber membrane filters according to claim 1, wherein said hollow fiber membrane filter has been sterilized by a steam sterilization method.

14. The hollow fiber membrane of claim 1, wherein the vitamin E is a α-tocopherol or a tocotrienol.

15. The hollow fiber membrane according to claim 1, wherein the polyvinylpyrrolidone content, based on the total weight of the hollow fiber membrane, is 5-8%.

16. The hollow fiber membrane according to claim 1, wherein the polyvinylpyrrolidone content, based on the total weight of the hollow fiber membrane, is 5-7%.

17. A hollow fiber membrane for the separation of blood plasma from blood, comprising a blood contact layer and a support layer, each comprising a hydrophobic polymer, a hydrophilic polymer and vitamin E, wherein the vitamin E, is present in an amount of 0.005 to 0.25 wt. % relative to the total weight of the hollow fiber membrane, the blood contact layer and the support layer are porous layers, the hydrophilic polymer comprises polyvinylpyrrolidone, and the blood contact layer in a near-surface layer, determined by XPS measurement, has a polyvinylpyrrolidone content of 35 to 55 wt. % and wherein
the hollow fiber membrane has a sieving coefficient for albumin, determined according to DIN EN ISO 8637-3:2018, of 50 to 100%, or wherein
the hollow fiber membrane has a sieving coefficient for immunoglobulin M, determined according to DIN EN ISO 8637-3:2018, of 50 to 100%, or wherein
the hollow fiber membrane has a sieving coefficient for low density lipoprotein, determined according to DIN EN ISO 8637-3:2018, of 80 to 100%.

18. The hollow fiber membrane according to claim 17, wherein the polyvinylpyrrolidone content of the blood contact layer in the near-surface layer is 40 to 50 wt. %.

* * * * *